No. 774,350. Patented November 8, 1904.

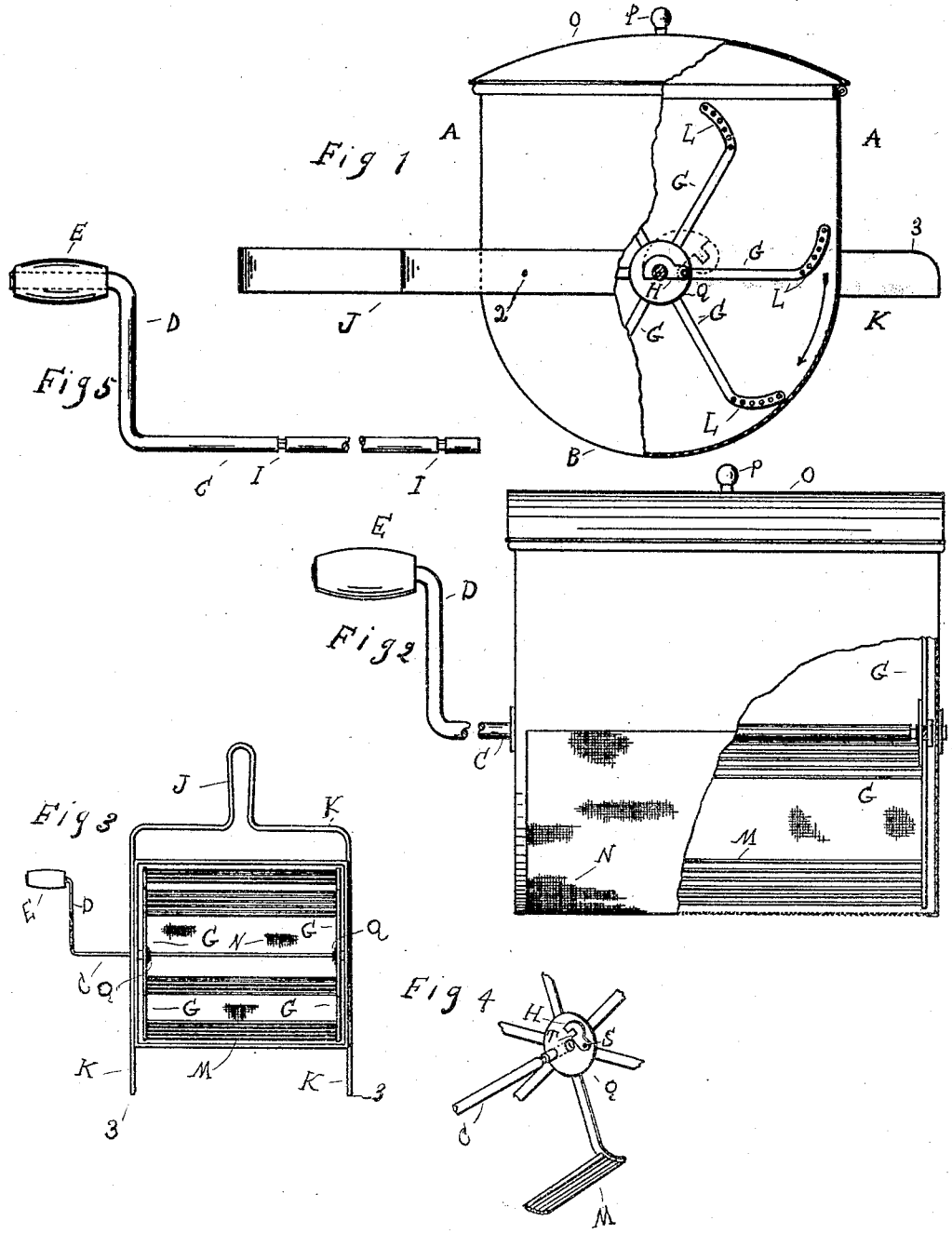

UNITED STATES PATENT OFFICE.

LIZZIE PETTIS CASTLE, OF WICHITA, KANSAS.

FRUIT-COLANDER.

SPECIFICATION forming part of Letters Patent No. 774,350, dated November 8, 1904.

Application filed March 2, 1904. Serial No. 196,140. (No model.)

*To all whom it may concern:*

Be it known that I, LIZZIE PETTIS CASTLE, a resident of Wichita, in the county of Sedgwick and State of Kansas, have invented certain new and useful Improvements in Fruit-Colanders; and I do hereby declare the following to be a full, clear, and exact description of the invention, such as will enable others skilled in the art to which it appertains to make and use the same.

My invention relates to improvements in fruit-colanders, and has for its object the construction and arrangement of a plurality of rods arranged upon the outer ends of radial arms projecting from a turning shaft in such a manner that the said wings will separate the fruit from the seeds, some of it passing through the sieve and some up between the said rods within the sieve, and yieldingly pass over the seeds should too many collect at one time. I attain these objects by the mechanism illustrated in the accompanying drawings, in which—

Figure 1 is an end elevation of my colander with a portion of the exterior end removed, showing the radial arms positioned within the machine. Fig. 2 is a side elevation with a portion of the sieve broken away, showing the wings and the connection with the radial arms. Fig. 3 is a plan view. Fig. 4 illustrates the attachment of the radial arms to the rotating shaft. Fig. 5 is the rotating shaft detached.

Similar letters refer to similar parts throughout the several views.

In the accompanying drawings, A represents a rectangular box having a semicylindrical sieve-bottom. A shaft C passes longitudinally through the ends of the box A. The radial arms C are affixed to hubs Q by any common means. In the present instance they are cast therein. The said hubs have a round opening in the center thereof to admit the shaft C. To the side of said hubs are pivotally secured by rivets S trip-latches H, the rivet being drawn tight enough to hold the said latch in any position desired. In the free end thereof is a notch T. A portion I of the shaft C is squared, as seen in Fig. 5. When the shaft C is passed through the hubs Q, the trip-latches H are dropped down over the squared portion I of the shaft C, which locks the said shaft in the hubs Q, and will thereby rotate the radial arms G, as clearly seen in Fig. 1. The free ends of the radial arms G are curved opposite the direction of rotation, as shown, Fig. 1, and have round openings L therein to receive the ends of the round rods M, which ends are rigidly secured therein. On one end of the shaft C is a crank D, on which is a handle E.

A piece of flat iron K is bent in form approximating a U, having a handle J. Said iron is passed over either side of the colander and is rigidly secured thereto by rivets 2. A portion 3 of the flat iron K projects beyond the colander, which is for the purpose of resting on the top edge of a jar or other vessel when in use. The portion J can be held in the hand or rested on the other edge of the jar, as desired.

A lid O, having centrally affixed thereto a knob P, is placed on the top of the colander for the purpose of keeping the fruit hot while it is being worked through the colander, as it is known fruit goes through more readily when hot than cold.

Having described the details of construction of my colander, I will now proceed to describe its operation generally. When it is desired to assemble the colander for use, the radial arms are placed inside the colander, and the shaft C is passed through the portion A and through the hubs Q, and the trip-latches H are placed on the square portion I of the shaft C, and the colander is filled with fruit. The lid O is placed thereon to keep the fruit hot. The shaft C is rotated in the direction indicated by the arrow, which causes the rods M to grind the fruit off the seeds and force it through the sieve N. It will be seen in Fig. 1 the position the rods M are placed they have a tendency to collect the fruit between themselves and the sieve, by which means the fruit is taken off one side of the seed and forced up between the rods M, while the other portion is forced down through the sieve. I therefore have a double action for separating. If too many seeds collect under the rods M, said rods will spring up and allow the surplus to pass under. When the work is finished and the colander is to be cleaned, the trip-latch is lifted and the shaft C drawn out, the radial arms lifted out, and the machine thoroughly cleaned.

It is obvious that the invention herein set forth is susceptible to many changes and modifications involving mechanical skill which may be made within the scope of the invention without departing from the spirit thereof. I do not, therefore, desire to be understood as limiting myself to the precise construction of the parts shown in the drawings.

Having thus described my invention, what I claim, and wish to secure by Letters Patent, is—

In a fruit-colander the combination of the longitudinal shaft C, hubs Q, mounted on said shaft, trip-latches H, pivotally secured to said hubs to engage the shaft C, arms G, extending from said hubs and curved out of radial plane, said arms connected in pairs by a plurality of rods M, as shown and specified.

In testimony whereof I have signed this specification in the presence of two subscribing witnesses.

LIZZIE PETTIS CASTLE.

Witnesses:
C. Q. McCoy,
E. S. Davison.